United States Patent
Daouse et al.

(10) Patent No.: US 8,545,913 B2
(45) Date of Patent: Oct. 1, 2013

(54) PROCESS FOR PREPARING, PRIOR TO FILLING, A WAFER CORNET, CORNET THUS OBTAINED AND INSTALLATION FOR IMPLEMENTING THE PROCESS

(75) Inventors: Alain Bernard Daouse, Noailles (FR); Christian Jean Marie Mange, Beauvais (FR)

(73) Assignee: Nestec S.A., Vevey (CH)

( * ) Notice: Subject to any disclaimer, the term of this patent is extended or adjusted under 35 U.S.C. 154(b) by 1800 days.

(21) Appl. No.: 10/599,311

(22) PCT Filed: Feb. 14, 2005

(86) PCT No.: PCT/EP2005/001448
§ 371 (c)(1),
(2), (4) Date: Sep. 25, 2006

(87) PCT Pub. No.: WO2005/096827
PCT Pub. Date: Oct. 20, 2005

(65) Prior Publication Data
US 2007/0204571 A1   Sep. 6, 2007

(30) Foreign Application Priority Data
Apr. 9, 2004  (EP) .................................... 04290952

(51) Int. Cl.
| | | |
|---|---|---|
| *A21C 15/00* | (2006.01) | |
| *A23G 9/28* | (2006.01) | |
| *B65B 1/04* | (2006.01) | |
| *B65B 7/18* | (2006.01) | |
| *A23G 9/48* | (2006.01) | |

(52) U.S. Cl.
CPC ... *B65B 1/04* (2013.01); *B65B 7/18* (2013.01); *A23G 9/48* (2013.01)
USPC ................................ 426/95; 53/472; 53/284.5

(58) Field of Classification Search
CPC ....... A21C 15/002; A23G 9/44; A23G 9/506; A23G 9/48; A01G 5/02; B65B 5/04; B65B 5/103; B65B 7/18; B65B 43/54; B65B 43/48
USPC .................................. 426/95; 53/473, 284.5
See application file for complete search history.

(56) References Cited

U.S. PATENT DOCUMENTS 2,670,696 A * 3/1954 Covert et al. ................. 425/217
3,171,367 A * 3/1965 Carter et al. ................. 426/282
(Continued)

FOREIGN PATENT DOCUMENTS

| EP | 0350352 | 1/1990 |
|---|---|---|
| EP | 0733308 | 9/1996 |

(Continued)

*Primary Examiner* — Jerry W Anderson
(74) *Attorney, Agent, or Firm* — K&L Gates LLP

(57) ABSTRACT

Process for preparing a cornet consisting of a substantially conical wafer (22) prior to the filling of said cornet with an ice-cream; in order to preserve the crunchy nature of the wafer, the inner wall of the cornet is sprayed with liquid chocolate (23); this chocolate solidifies rapidly in order to form a coating layer for separating the wafer and the ice-cream. The process is characterized in that the inside of the cornet is sprayed with an excess quantity of chocolate to guarantee that no coating-gap zone remains on the inner wall of the wafer, the excess liquid chocolate collecting, under gravity, at the bottom tip of the cornet; prior to solidification of said excess, the excess is sucked out of the cornet, subsequent solidification of the coating layer thus making it possible to establish a continuous barrier over the inner wall of the wafer.

7 Claims, 4 Drawing Sheets

(56) References Cited

U.S. PATENT DOCUMENTS

| | | | | |
|---|---|---|---|---|
| 3,552,212 A | * | 1/1971 | Ohlin | 73/864.22 |
| 4,505,220 A | | 3/1985 | Ruberstein et al. | |
| 6,006,535 A | | 12/1999 | Cathenaut | |
| 2005/0098575 A1 | * | 5/2005 | Carhuff et al. | 221/150 R |

FOREIGN PATENT DOCUMENTS

| | | |
|---|---|---|
| EP | 0784934 | 7/1997 |
| FR | 1547899 | 11/1968 |
| GB | 457162 | 11/1936 |

* cited by examiner

PROCESS FOR PREPARING, PRIOR TO FILLING, A WAFER CORNET, CORNET THUS OBTAINED AND INSTALLATION FOR IMPLEMENTING THE PROCESS

The invention relates to a treatment applied to wafer cornets for packaging a food product, the wafer being consumed by the user at the same time as the food product thereby packaged. More particularly, the invention relates to the production of cornets for packaging an ice-cream.

When an ice-cream is packaged in a conical cornet made from wafer, it is imperative to protect the wafer from contact with the ice-cream, without which the wafer loses its crunchy nature, which is a major handicap in terms of marketing. It has thus been proposed, in a known manner, to produce, on the inner wall of the conical wafer cornet, a layer of a coating agent consisting of chocolate, this layer forming a barrier between the wafer and the ice-cream packaged therein. The production of this sealing barrier involves a constraint, since it is necessary for the barrier to be totally continuous, otherwise the least gap in the coating gives rise to a loss of the crunchy nature of the wafer at least in the entire zone surrounding said gap. In order to prevent any risk of a fault and thus to guarantee the quality of the product marketed, it was thus decided to significantly increase the quantity of chocolate used as inner coating for the cornet, said chocolate being delivered into the cornet in the liquid state by means of a spray head that sprays it into the upper part of the cornet. However, although the spraying thus carried out prevents any risk of a gap, it results in a highly excess quantity of chocolate being used compared with that which would be just necessary to produce a continuous, uniform layer on the inner wall of the wafer cone such that the excess flows towards the bottom tip of the wafer cone, i.e. towards the point of the cone. This situation gives rise to a number of drawbacks: firstly, if the lower part of the cone is filled with chocolate, the consumer purchasing an ice-cream cone is left with a product that contains a smaller quantity of ice-cream than that which he was entitled to expect when seeing the external size of the cone, since the lower part of the cone is filled with chocolate; secondly, the quantity of chocolate used in manufacture is markedly greater than that necessary for coating the wafer, such that the cost price of the product is significantly increased; thirdly, the chocolate that has flowed into the lower part of the cone forms a mass which cools more slowly than the thin coating layer with the result that the manufacturing cycle for the finished product is longer because it is not possible to insert the ice-cream before the chocolate has solidified.

An object of the present invention is to remedy the above-mentioned drawbacks in a simple manner: to avoid the loss of the crunchy nature of the wafer, the inner wall of the wafer is sprayed with a fluid coating agent, for example chocolate, in an excess quantity compared with that which would be strictly necessary to establish a continuous layer over the inner wall of the wafer, such that an excess of coating agent flows to the bottom of the cone, and, in a second stage, using a pipette, the excess coating agent is sucked out and this excess is recovered and then recycled with a view to the spraying of another wafer cornet. In this way, the cost arising from the use of excess coating agent is eliminated, the dissatisfaction on the part of the consumer is eliminated since the entire inner volume of the cornet thus prepared may be filled with the food product the customer wished to purchase, for example an ice-cream, and extension of the manufacturing cycle is eliminated since only the coating agent in the form of a thin layer over the wafer remains in the cornet.

Consequently, a subject of the present invention is a process for preparing a container consisting of a wafer, said preparation being carried out prior to the filling of said container with a food product, the wall of said container extending between an outwardly open mouth zone and a narrower zone forming an outwardly closed end, in which process, in order to preserve the crunchy nature of the wafer, the container is arranged such that the closed, narrow end of the wafer forms the bottom tip of the container and the inner wall of the container is sprayed with a liquid coating agent, said coating agent being capable of solidifying rapidly in order to form a coating layer intended, after the food product has been placed in the container, to separate the wafer and the food product, said coating layer being provided in order, subsequently, to be consumed at the same time as the wafer and said food product, characterized in that the inside of the container is sprayed with an excess quantity of coating agent that is sufficient to guarantee that no coating-gap zone remains on the inner wall of the wafer that is to come into contact with the food product, the excess liquid coating agent collecting, under gravity, at the bottom tip of the container, and in that, prior to the solidification of said excess, the excess is sucked out of the container, subsequent solidification of the coating layer thus making it possible to establish a continuous barrier over the inner wall of the wafer.

In a preferred embodiment, the excess coating agent sucked out is recycled to the supply for spraying the inside of a container. Provision may advantageously be made for the coating agent to be sucked up via a pipette of which one end has sufficiently small dimensions to be able to be positioned close to the bottom tip of the container, said end including at least one suction orifice, and in that, after suction, the orifice(s) is(are) supplied with a gaseous flow in order to expel any possible clogging particles that might be found therein: in fact, during handling, wafers frequently generate small particles that, after the spraying operation, are in suspension in the excess coating agent in the bottom part of the cornet, these particles being sucked out at the same time as said excess and being capable of clogging the suction orifices of the pipette. The blowing-through of a gaseous flow allows the particles to be ejected and thus any clogging of the suction pipettes to be prevented. It is possible for the suction orifice(s) to have a gaseous flow blown through it (them) which ejects the particles in the same direction as the passage direction of the flow of recycled coating agent. It is possible to arrange the suction orifice(s) in the vicinity of the base of a pipette that slides in a guide capable of scraping the outer wall of said pipette in order to cause the particles of wafer sticking to said outer wall to fall, under gravity, into the container. It is also possible to produce the suction orifice(s) by arranging it (them) laterally on the pipette, and provision is made for the guide to include a chamber for blowing the gaseous flow in order to expel the particles of wafer wedged in the orifice(s).

In a preferred application of the process according to the invention, use is made, as container, of a substantially conical cornet. The coating agent may be chocolate. In a particularly advantageous application, the food product is a highly viscous product, particularly an ice-cream.

A further subject of the present invention is a container formed from a wafer coated on the inside with a continuous layer of coating agent, characterized in that it is obtained by means of the process as defined above.

A final subject of the present invention is an installation for implementing the process as defined above, this installation comprising, firstly, a conveyor with discontinuous displacement in successive steps, said conveyor including elements on each of which at least one receptacle is provided in order to receive a container formed by a wafer, the wall of said container extending between an outwardly open mouth zone and a narrower zone forming an outwardly closed end, said container being arranged in its receptacle such that its closed end forms the bottom tip of the wafer and, secondly, a spray station on which is arranged, in line with each container carried by a conveyor element that arrives opposite the spray station at a stop instant of said conveyor, a spray head capable of spraying the inner wall of the wafer, said spray head being able to move between a low position in which, in order to distribute the coating agent, the head is positioned in or in the vicinity of the mouth of the container, and a high position that allows the displacement of the conveyor, characterized in that it includes, thirdly, a suction station on which is arranged, in line with each container carried by a conveyor element that arrives opposite the suction station at a stop instant of the conveyor, a suction pipette that includes, at its bottom end, at least one suction orifice, the suction pipette being able to move between a low position, in which its bottom end arrives in the vicinity of the bottom tip of the wafer, and a high position that allows the displacement of the conveyor, said suction station being located downstream of the spray station in the direction of displacement of the conveyor.

In a preferred embodiment, the high position of each pipette of the suction station brings the suction orifice(s) into a chamber where a gaseous flow blows through the orifice(s). Provision may be made for each pipette to include an inner channel via which the excess coating agent is conveyed to a reservoir under reduced pressure, the gaseous flow that blows through the orifice(s) originating from an air inlet provided in each chamber, this blowing air being sent towards the reservoir as is the sucked-out coating agent. The reservoir may be equipped with a device for adjusting the air pressure prevailing therein. The reservoir may supply a pump that provides the coating agent to the spray station at a pressure that is greater than atmospheric pressure.

According to an advantageous embodiment, the installation according to the invention employs a coating agent that is fluid when hot and solidifies by simple cooling to ambient temperature; between, on the one hand, the pump that provides the coating agent to the spray station and, on the other hand, the spray station itself, a heat exchange may be interposed to guarantee maintenance of the coating agent at a temperature that is sufficient for the fluidity of said agent to allow correct functioning of the spray and suction stations and also circulation without clogging of the coating agent upstream and downstream of the reservoir.

According to a preferred embodiment, at least one filter is interposed on the pipes for circulating the coating agent such that the particles of wafer blown by the gaseous flow in the suction orifices and dispersed in the coating agent are halted and removed from the circulating coating agent. Advantageously, the installation includes a filter arranged on the circulation pipe connecting the heat exchanger and the spray station.

As container, it is preferred to use a substantially conical cornet. The coating agent is advantageously chocolate, particularly when the product packaged in the container is an ice-cream.

In order to make the subject of the invention more easily understood, a description will now be given, by way of purely illustrative and non-limiting example, of an embodiment shown in the appended drawing.

Figure 1:
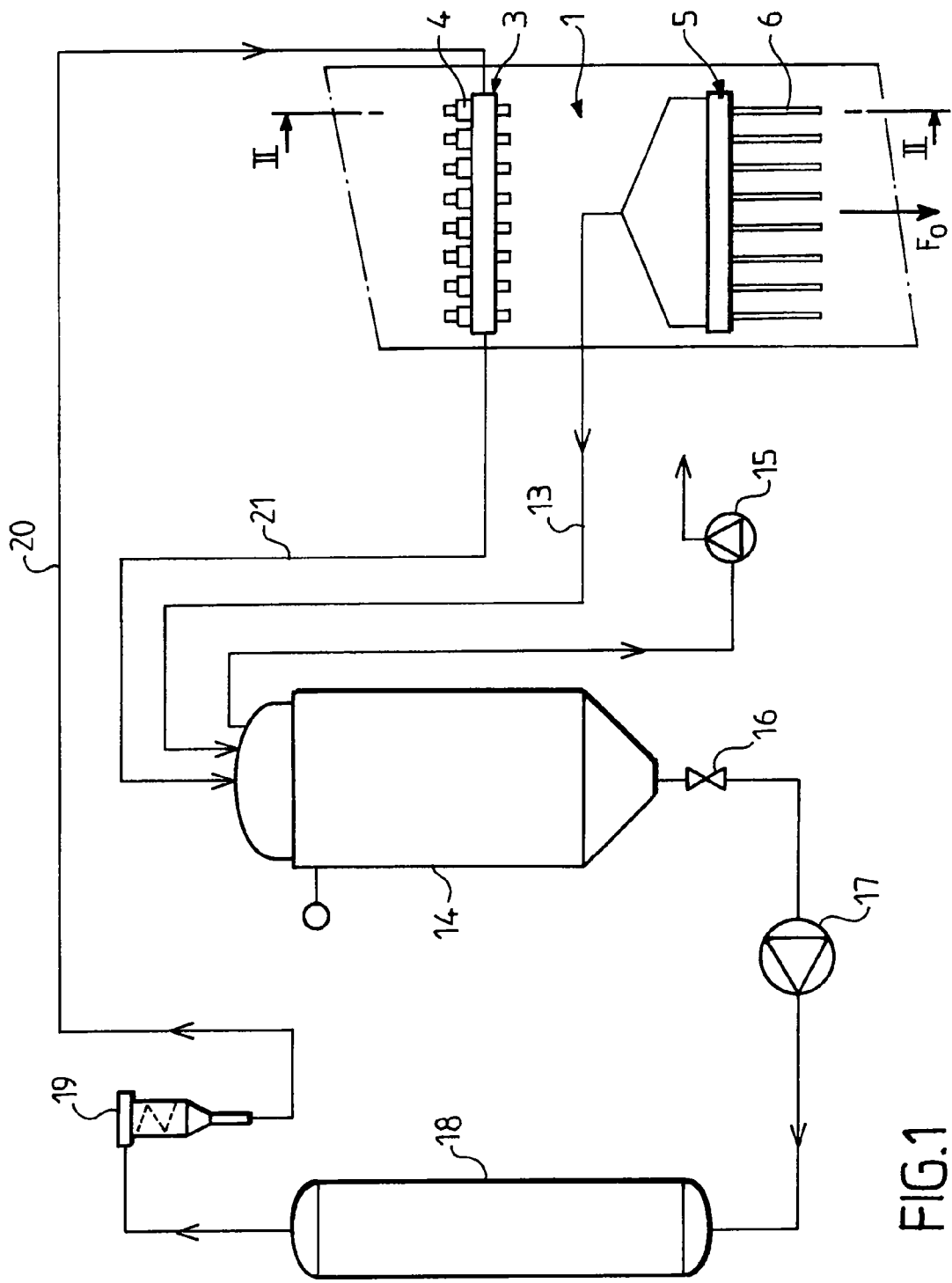
FIG. 1 is a general diagram of an installation implementing the process according to the invention.

With reference to the drawing, it may be seen that an installation according to the invention includes a horizontal conveyor denoted by 1 overall, the conveyor 1 consisting of a plurality of elements that are all identical to one another, each element having, seen in plan, a rectangular general shape and including eight identical receptacles 2 arranged side by side. The receptacles 2 have a frustoconical shape and are supplied by an automatic dispenser (not shown) of conical wafers. The major axis of the rectangular elements of the conveyor is perpendicular to the direction of displacement of said conveyor 1, this direction corresponding to the arrow $F_0$ in FIG. 1.

The conveyor 1 is associated with a spray station that is denoted by 3 overall. The spray station includes as many spray heads 4 as there are receptacles 2 on one and the same conveyor element, each receptacle 2 being able to arrive in line with a spray head during the displacement of the conveyor. The conveyor 1 has discontinuous displacement in successive steps, the step of the conveyor corresponding to the step separating two successive elements of said conveyor. The spray heads 4 of the spray station 3 are capable of moving vertically relative to the conveyor, in the direction of the arrows $G_1$ and $G_2$ in FIGS. 2 and 3. The support relative to which the spray heads 4 can move in translation has not been shown in the drawing with a view to simplification, nor has the control of the translational movements of these spray heads.

At a distance of three displacement steps of the conveyor, there is, downstream of the spray station 3, a suction station 5 that is, overall, arranged above the conveyor, parallel to the spray station 3. When the conveyor is stopped between two successive displacements, an element of the conveyor presents, in line with the suction station 5, the eight receptacles 2 that it includes. In line with each receptacle, the suction station includes a suction pipette 6 consisting of a vertical tube of which the lower end 6a is conical and closed off and of which the upper end includes a connector 6b integral with a means for driving in vertical translation, not shown. Between these two ends, the suction pipette 6 passes through a guide denoted by 7 overall, the guide 7 being integral with a support 8 forming a fixed element of the suction station 5.

Figure 5:
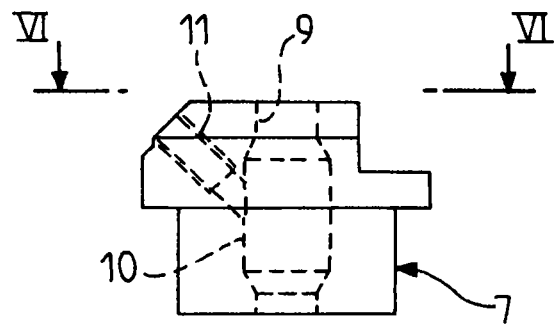
FIG. 5 shows, in elevation, a pipette guide that includes a blowing chamber.
Figure 6:
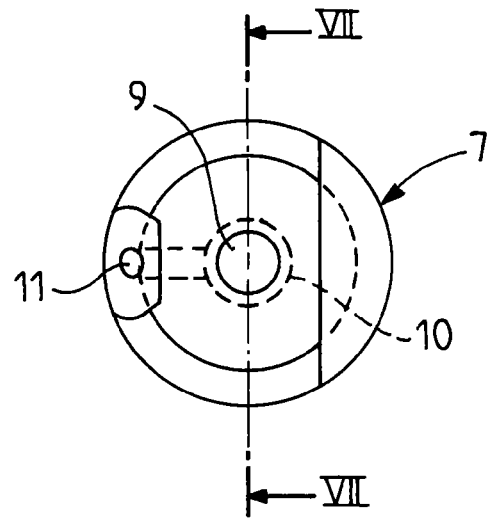
FIG. 6 shows a plan view of the guide in FIG. 5 on VI-VI in FIG. 5.
Figure 7:
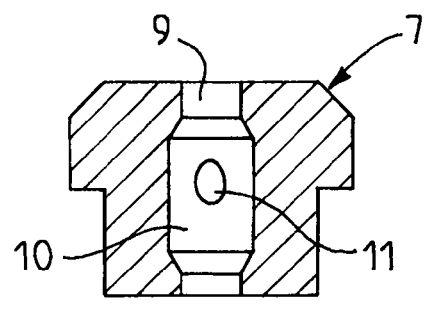
FIG. 7 shows a section through the guide of FIG. 5, on VII-VII in FIG. 6.

Shown in detail in FIGS. 5 to 7, the guide 7 is a piece of approximately cylindrical general shape, and it includes, along its axis, a bore 9 of which the central part widens in order to form a chamber 10. The external diameter of the pipette 6 and the diameter of the bore 9 are practically identical except for the sliding clearance. An air-inlet channel 11 opens out into the chamber 10 and is connected to a supply of compressed air at 4 bar. In the lower part of the pipette 6 are suction orifices 12 arranged laterally just above the conical part closing the lower end 6a of the pipette 6. All the suction pipettes 6 of the suction station 5 are connected to a manifold and, from there, via a heat-insulated pipe 13, to a reservoir 14 maintained at reduced pressure by virtue of a pump 15.

The output from the reservoir 14 is obtained via a valve 16 and then a pump 17 supplying a heat exchanger 18 of which the output is obtained via a filter 19. The filter 19 supplies, via a pipe 20, the inlet of the spray heads 4, the surplus supply being conveyed by the pipe 21 back to the reservoir 14. The connecting pipes, on the one hand between the reservoir 14 and the heat exchanger 18 and on the other hand between the heat exchanger 18 and the filter 19, and the pipes 20 and 21 are thermally insulated and, like the pipe 13, include a circulation of hot liquid to minimise heat losses.

Each receptacle 2 of the conveyor 1 receives, via an automatic dispenser, a conical wafer cornet denoted by 22 in the drawing. The cornet 22 is presented in line with a spray head 4 and, when the conveyor is stopped between two successive steps, the spray head 4 descends in the direction of the arrow $G_1$ in FIG. 2 to deliver into the mouth forming the top part of the cornet hot liquid chocolate 23 supplied by the pipe 20. The hot chocolate is sprayed onto the inner wall of the wafer cornet 22, and sufficient chocolate is sprayed so that it can be guaranteed that no gap remains in the coating of said inner wall. In order to guarantee the absence of such gaps, the quantity of chocolate sprayed must be an excess: for example, 12 grams of chocolate will be sprayed into a cornet although the coating layer remaining on the wall of the wafer is approximately 6 grams. The remaining 6 grams collect in the bottom part of the cornet, as may be seen clearly in FIGS. 2 and 3 in the case of the cornets between the spray and suction stations. When this spray operation is completed, the spray head 4 rises back up in the opposite direction from the arrow $G_1$.

Figure 2:
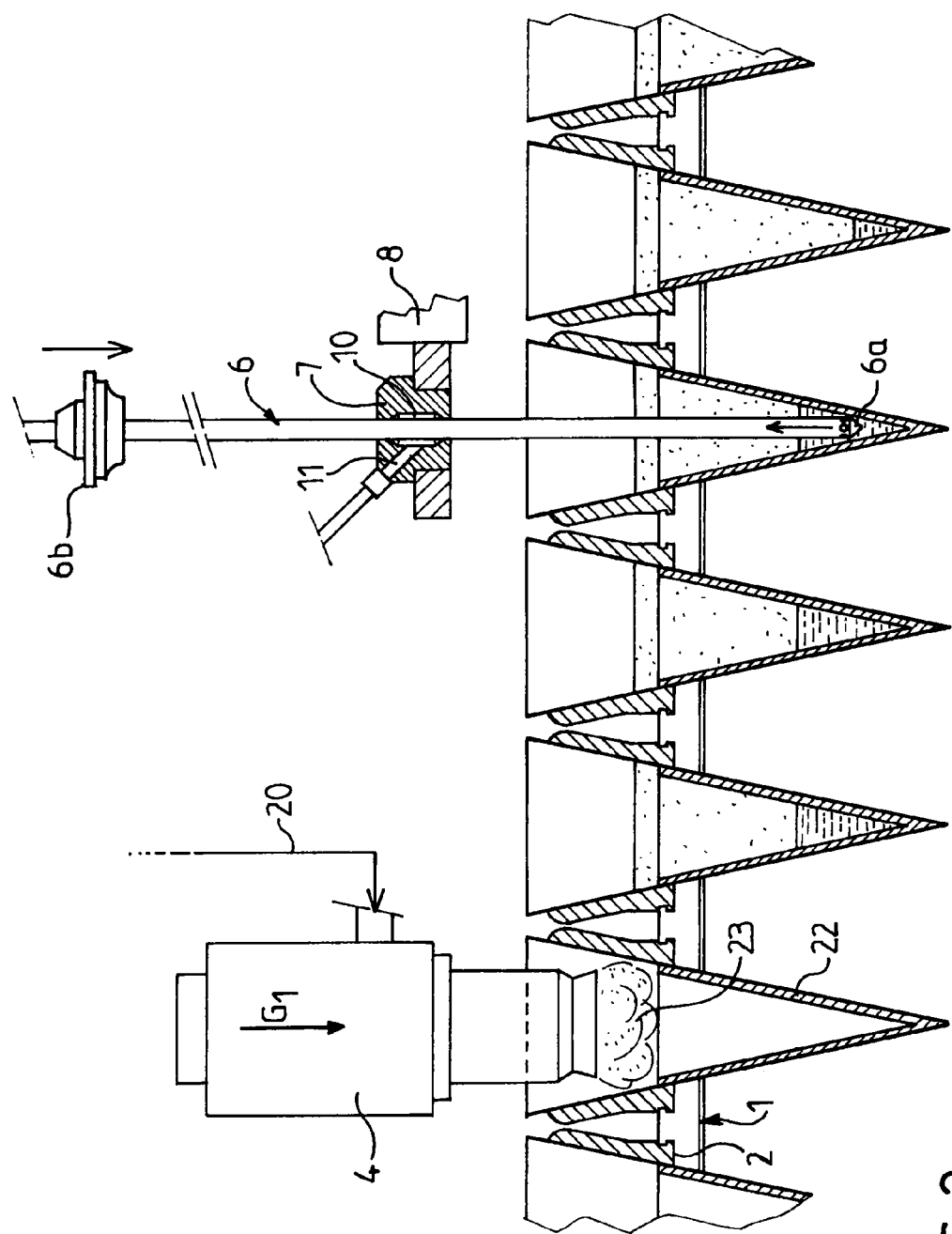
FIG. 2 is a diagrammatic view on II-II in FIG. 1 of a conveyor equipped with a spray station and a suction station, these two stations being in the process of functioning and the conveyor being stopped.

At the same time, in line with the suction station, the suction pipette 6 comes into a low position, as indicated in FIG. 2, its conical lower end 6a arriving at the bottom of the wafer cone. As each suction pipette 6 is connected by the pipe 13 to the reservoir 14, which is at reduced pressure, liquid chocolate located in the bottom part of the cornet is sucked up via the orifices 12 made at the bottom of each pipette. The sucked-up chocolate is always liquid because the time it takes to move from the spray station 3 to the suction station 5 is approximately 5 seconds, which is insufficient for the chocolate to have time to solidify. When this suction has been completed, the suction pipette 6 is raised back into the high position via its connector 6b, and it slides upwards through the guide 7 until the orifices 12 are in the chamber 10. At this point, compressed air supplied by the air inlet 11 passes through the orifices 12 and unblocks them by blowing if wafer particles have been retained in said orifices, these particles having been conveyed by the liquid chocolate when it was sucked up. The guides 7 also allow, given the fact that the orifices 12 are arranged laterally, the pipettes 6 to be scraped and the broken, large wafer particles to fall again down into the bottom of the cones, whereas the blowing in the guides makes it possible to expel the particles wedged in the thickness of the wall delimiting the orifices 12.

Figure 3:
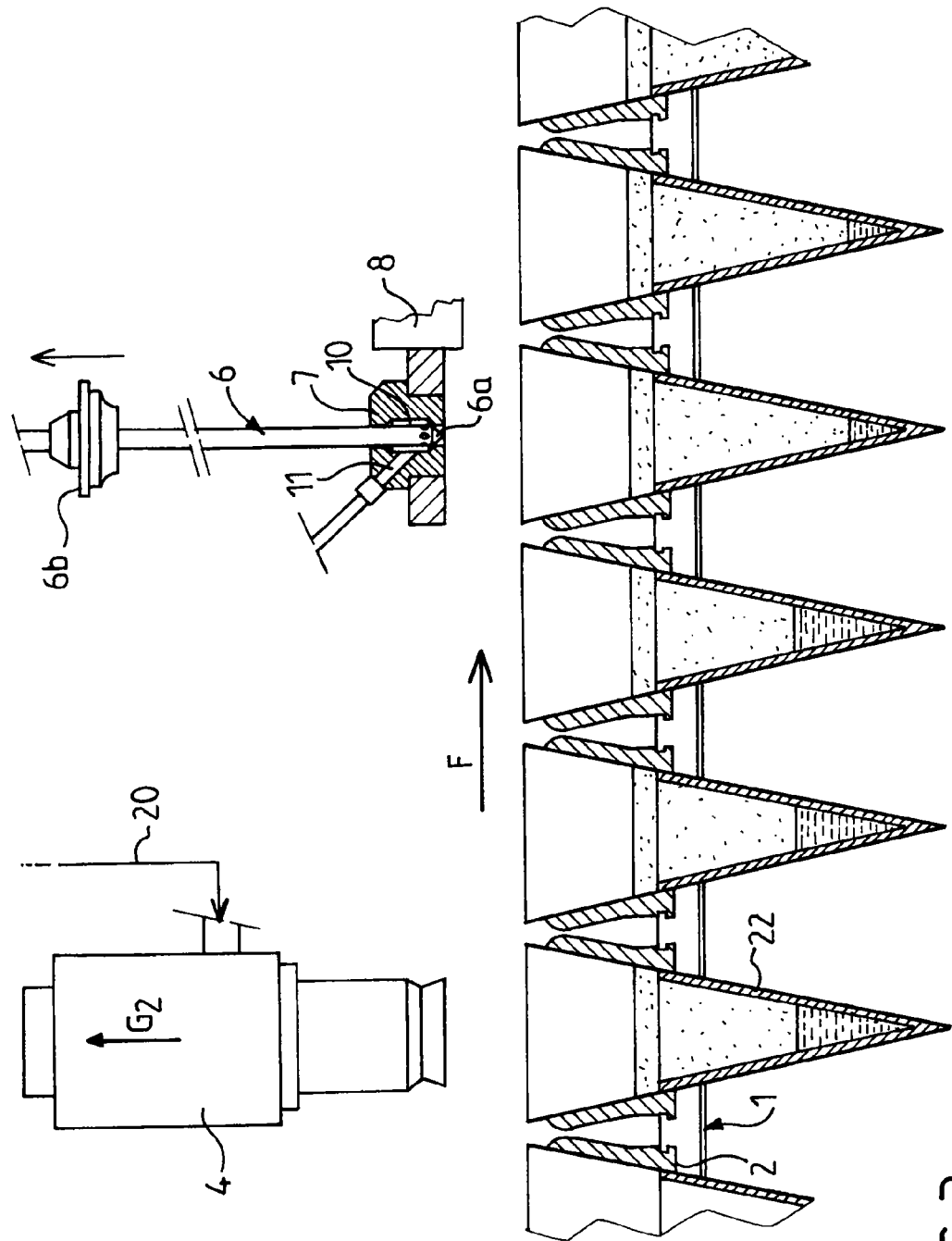
FIG. 3 shows a diagrammatic view, similar to FIG. 2, in which the spray and suction stations have been raised into the high position, the conveyor moving in the direction of the arrow F.
Figure 4:
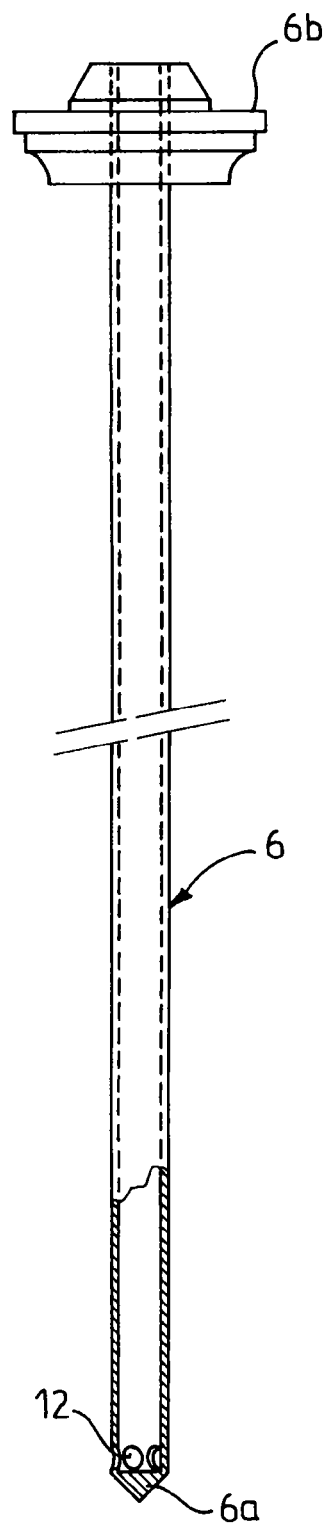
FIG. 4 shows, in elevation, a suction pipette, the bottom part of this pipette being shown in axial section.

When the spray heads 4 and the suction pipettes 6 have returned to their high position, they are passed above the wafer cornets and the receptacles 2 such that the conveyor 1 is able to advance by one step, as indicated by the arrow F in FIG. 3. After the excess chocolate has been sucked up, there remains very little liquid chocolate in the bottom of the cornet, so the remaining chocolate will rapidly solidify. It is thus possible fairly rapidly to make provision for the placing of an ice-cream in the cornet thus prepared, this ice-cream filling the chocolate-covered wafer cornet. Given the large quantity of chocolate used in spraying, there is no gap in the coating over the inner wall of the wafer and thus no risk of the disappearance of or a reduction in the crunchy nature of the wafer when the cornet is filled with ice-cream.

As has been ascertained from the preceding description, the excess chocolate is sucked up through the action of the reduced pressure prevailing in the reservoir 14. Chocolate is ejected via the spray heads 4 through the action of the pressure of the supply generated by the pump 17 in the pipe 20. The reduced pressure is maintained in the reservoir 14 by the pump 15. The wafer particles ejected from the orifices 12 by virtue of the compressed air sent via the air inlet 11 are sent back via the pipe 13 into the reservoir 14 and then filtered out in the filter 19 after the chocolate has been heated up by the heat exchanger 18. In this way, the hot chocolate conveyed into the spray heads 4 is free from wafer particles and the excess supply not used by the spray heads 4 is conveyed back to the reservoir via the pipe 21 to ensure that the temperature of the chocolate is maintained.

The invention claimed is:

1. A process for preparing a container comprising a wafer and having a wall extending between an outwardly open mouth zone and a narrower zone forming an outward end, the container being arranged such that the closed, narrow end of the wafer forms the bottom tip of the container, the process comprising, prior to a filling of the container with a food product, the steps of:
   spraying the inner wall of the container with a liquid coating agent that is capable of solidifying rapidly in order to form a coating layer intended, after the food product has been placed in the container, to separate the wafer and the food product, the coating layer being provided in order, subsequently, to be consumed at the same time as the wafer and the food product, the inside of the container being sprayed with an excess quantity of coating agent, the excess quantity being sufficient to prevent a coating-gap zone on the inner wall of the wafer that is to come into contact with the food product;
   allowing excess liquid coating agent to collect, under gravity, at the bottom tip of the container;
   removing, prior to the solidification the excess liquid coating agent;
   recycling the excess coating agent to a supply for spraying the inside of the container, the excess coating agent being removed via a pipette positioned close to the bottom tip of the container, an end of the pipette including at least one suction orifice; and
   after suction, supplying the orifice with a gaseous flow in order to expel any possible clogging particles that might remain therein, wherein the gaseous flow is blown through the suction orifice so that the flow ejects the particles in a direction that is the same as a passage direction of the flow of recycled coating agent.

2. A process according to claim 1, wherein the suction orifice is located in a vicinity of a base of a pipette that slides in a guide capable of scraping the outer wall of the pipette causing particles of wafer sticking to the outer wall to fall, under gravity, into the container.

3. A process according to claim 2, wherein the suction orifice is positioned laterally on the pipette, and the guide comprises a chamber for blowing the gaseous flow in order to expel the particles of wafer wedged in the orifice.

4. A process according to claim 1, wherein the container is a substantially conical cornet.

5. A process according to claim 1, wherein the coating agent is chocolate.

6. A process according to claim 1, wherein the food product is an ice-cream.

7. A process comprising the steps of:
prior to filling of a container consisting of a wafer with a food product, spraying an inner wall of the container with a liquid coating agent, the coating agent being capable of solidifying rapidly in order to form a coating layer to separate the wafer and the food product in the container, the inside of the container being sprayed with an excess quantity of coating agent to prevent a coating-gap zone on the inner wall of the wafer that comes into contact with the food product, the excess liquid coating agent collecting, under gravity, at a bottom tip of the container, and prior to the solidification of the excess, the excess is suctioned out of the container and recycled to the supply for spraying the inside of the container, the coating agent being suctioned out using a pipette positioned close to a bottom tip of the container, an end of the pipette including at least one suction orifice, and after suction, the orifice is supplied with a gaseous flow in order to expel any particles from the orifice, wherein the gaseous flow is blown through the suction orifice so that the flow ejects the particles in a direction that is the same as a passage direction of the flow of recycled coating agent.

* * * * *